(12) United States Patent
Yamamoto et al.

(10) Patent No.: US 6,526,367 B1
(45) Date of Patent: Feb. 25, 2003

(54) WHEEL-SPEED ABNORMALITY DETECTING APPARATUS

(75) Inventors: Shinsuke Yamamoto, Numazu (JP); Toshimi Ishikawa, Anjo (JP); Yasuhito Ishida, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 186 days.

(21) Appl. No.: 09/586,989

(22) Filed: Jun. 5, 2000

(30) Foreign Application Priority Data

Jun. 8, 1999 (JP) ............................................. 11-160882

(51) Int. Cl.[7] ................................................. G01P 3/00
(52) U.S. Cl. ........................................ 702/148; 702/145
(58) Field of Search ................................. 702/148, 145; 241/37; 364/424, 565; 318/113, 12, 1

(56) References Cited

U.S. PATENT DOCUMENTS 5,163,170 A * 11/1992 Grabowski .................. 318/113
5,459,661 A * 10/1995 Yagi et al. .................... 180/197
5,653,393 A *  8/1997 Tanaka et al. ............. 241/101.3
5,748,503 A *  5/1998 Saeki et al. ..................... 701/74

FOREIGN PATENT DOCUMENTS

JP          2803472          7/1998

* cited by examiner

*Primary Examiner*—John Barlow
*Assistant Examiner*—Tung Lau
(74) *Attorney, Agent, or Firm*—Oliff & Berridge, PLC

(57) ABSTRACT

When it is detected that a wheel speed $v_{FL}$ of at least one specific wheel $W_{FL}$ is nearly equal to zero but wheel speeds $v_{FR}$, $v_{RL}$, $v_{RR}$ of the other wheels $W_{FR}$, $W_{RL}$, $W_{RR}$ are not nearly equal to zero, the apparatus judges that the wheel speed $v_{FL}$ of the specific wheel $W_{FL}$ is abnormal, but cancels the abnormality judgment in a stuck state even if the wheel speed $v_{FL}$ of the specific wheel $W_{FL}$ was judged as being abnormal.

6 Claims, 2 Drawing Sheets

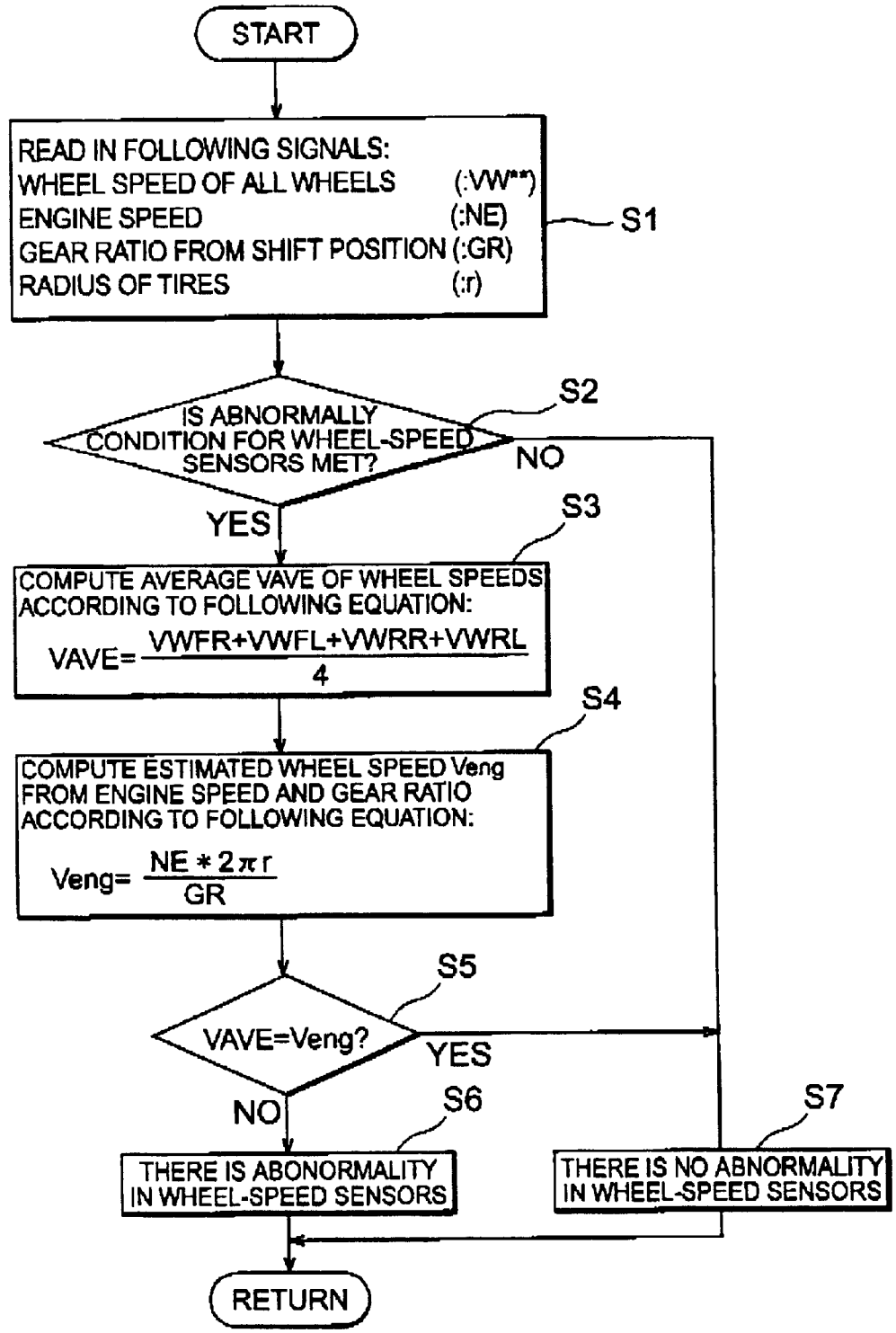

WHEEL-SPEED ABNORMALITY DETECTING APPARATUS

BACKGROUND OF THE INVENTION

1. Field of the Invention

The present invention relates to a wheel-speed abnormality detecting apparatus for detecting an abnormality in wheel-speed sensors and the like.

2. Related Background Art

A conventional wheel-speed abnormality detecting system is described in Japanese Patent Publication No. 2803472. This system is constructed to recognize that there is an abnormality in the wheel-speed sensors when a speed difference between the left and right non-driven wheels is over a predetermined value.

SUMMARY OF THE INVENTION

Under such circumstances that rotation of a specific wheel is physically restrained in comparison with rotation of the other wheels (e.g., when the specific wheel is in a stuck state), however, the speed difference between the left and right wheels becomes over the predetermined value, though the wheel speed sensor for the specific wheel is normal. The above conventional system thus misjudges that this state is an abnormality in the sensor accordingly.

The present invention has been accomplished in view of this problem and an object of the present invention is thus to provide a wheel-speed abnormality detecting apparatus restrained from making such a misjudgment.

In order to solve the above problem, the present invention presents a wheel-speed abnormality detecting apparatus for, with such detection that a wheel speed of at least one specific wheel is nearly equal to zero but wheel speeds of the other wheels are not nearly equal to zero, making a judgment that the wheel speed of the specific wheel is abnormal, wherein the abnormality judgment is canceled when rotation of the specific wheel is physically restrained in comparison with rotation of the other wheels.

In this case, when the rotation of the specific wheel is physically restrained in comparison with the rotation of the other wheels, the abnormality judgment is canceled even if the wheel speeds detected are in the above relation. Therefore, the apparatus is restrained from making a misjudgment.

The apparatus may also be arranged so that the above abnormality judgment is canceled by resetting a detection time necessary for the abnormality judgment.

Further, this wheel-speed abnormality detecting apparatus is preferably constructed so that a judgment that there is an abnormality in wheel speed is made when a predetermined relation is not established between an estimated wheel speed estimated based on speed of an engine for driving wheels and an average of wheel speeds of all the wheels.

The apparatus is characterized in that this predetermined relation is a relation of agreement or approximate agreement. The approximate agreement means agreement of these within ±20%.

It is preferable that all the wheels can be driving wheels under traction control.

BRIEF DESCRIPTION OF THE DRAWING

FIG. 2 is a flowchart for carrying out the wheel-speed abnormality detection.

DESCRIPTION OF THE PREFERRED EMBODIMENT

Figure 1:
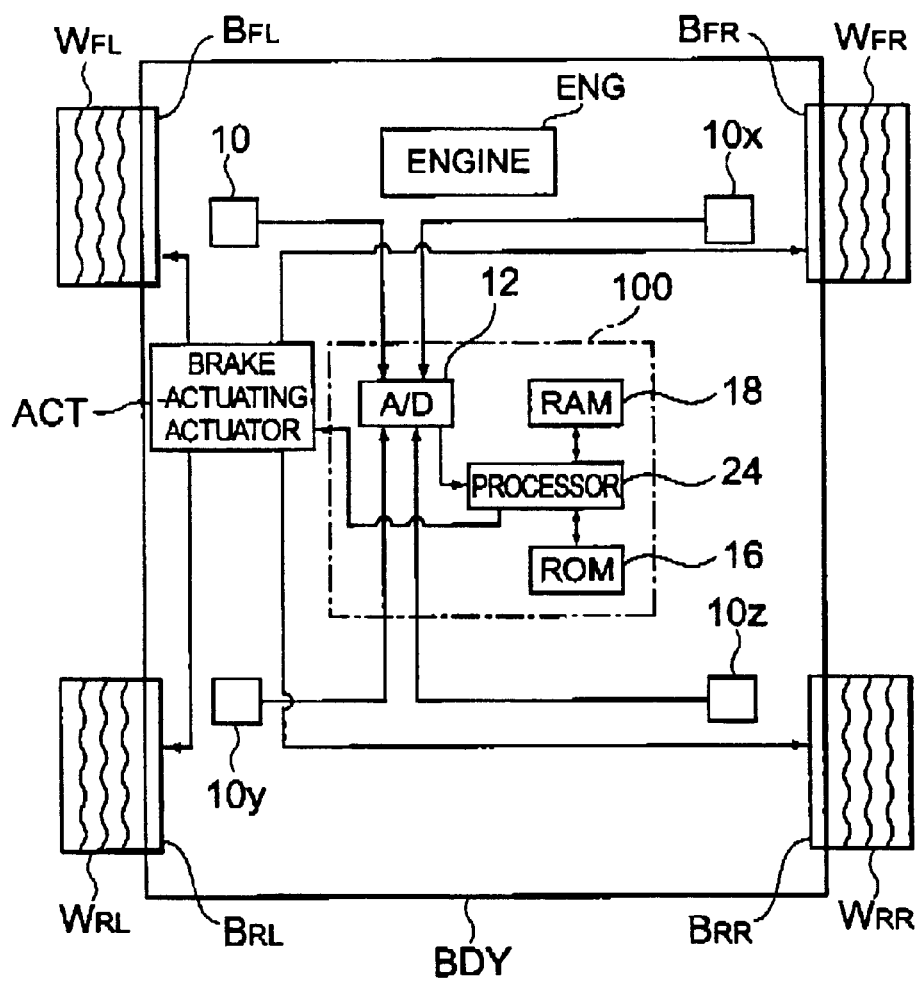
FIG. 1 is a schematic structural diagram of the vehicle equipped with the wheel-speed abnormality detecting apparatus according to the embodiment.

A wheel-speed abnormality detecting apparatus according to an embodiment will be described below. Like elements or elements having like functions will be denoted by like reference symbols and redundant description will be avoided.

FIG. 1 is a schematic structural diagram of a vehicle equipped with the wheel-speed abnormality detecting apparatus according to the embodiment.

This vehicle is provided with four wheels (front wheels $W_{FL}$, $W_{FR}$, and rear wheels $W_{RL}$, $W_{RR}$) which are arranged to be rotatable relative to the body BDY. Wheel speed sensors 10, 10x, 10y, and 10z are provided corresponding to the respective wheels $W_{FL}$, $W_{FR}$, $W_{RL}$, $W_{RR}$ and outputs thereof are proportional to wheel speeds. The wheel speed sensors 10, 10x 10y, 10z herein electrically/magnetically or optically detect rotational speeds of the wheels and output ac signals according to the rotational speeds.

The output from each sensor 10, 10x, 10y, 10z is entered into a control unit 100 including an ECU (electronic control unit), ABS (anti-lock braking system) & TRC (traction control system) computers, etc. mounted inside the vehicle.

The ac signal outputted from each sensor 10, 10x, 10y, 10z is entered via an A/D converter 12 into a processor 24 inside the control unit 100. The A/D converter 12 samples the ac signals from the wheel speed sensors at predetermined sampling timing and converts them into digital signals to supply them to the processor 24. The processor 24 processes the digital signals by use of programs stored in ROM 16 to detect the wheel speeds and car out various controls. The processor 24, ROM 16, and RAM 18 can be constructed of a computer.

The control unit 100 obtains the wheel speeds $v_{FL}$, $v_{FR}$, $v_{RL}$, $v_{RR}$ of the respective wheels, based on the input wheel speed information etc., displays vehicle speed computed from the wheel speeds obtained, on a display, and executes braking control based on the wheel speeds $V_{FL}$, $V_{FR}$, $V_{RL}$, $V_{RR}$.

Each of the wheels $W_{FL}$, $W_{FR}$, $W_{RL}$, $W_{RR}$ is provided with a brake $B_{FL}$, $B_{FR}$, $B_{RL}$, or $B_{RR}$ as a driving means for executing the braking control. The brakes $B_{FL}$, $B_{FR}$, $B_{RL}$, $B_{RR}$ are actuated by an actuator ACT for actuation of the brakes, to exert braking force on the wheels $W_{FL}$, $W_{FR}$, $W_{RL}$, $W_{RR}$. The braking control involves lock timing control of the wheels $W_{FL}$, $W_{FR}$, $W_{RL}$, $W_{RR}$ in ABS, slip suppressing control by TRC, vehicle motion control for stable posture, and so on.

For example, in the traction control supposing the front left wheel $W_{FL}$ is in a slipping state, the brake-actuating actuator ACT is driven to activate the brake $B_{FL}$, so as to exert the braking force on the front left wheel $W_{FL}$ to stop spinning thereof, thereby restraining the slip. In the ABS control the brake-actuating actuator ACT is driven so as to prevent a wheel about to lock from locking, based on the wheel speed.

The four-wheel drive (4WD) vehicles are vehicles the four wheels $W_{FL}$, $W_{FR}$, $W_{FL}$, $W_{RR}$ of which can be driving wheels. Namely, all the wheels $W_{FL}$, $W_{FR}$, $W_{RL}$, $W_{RR}$ act as driving wheels in the four-wheel drive mode, and the front wheels $W_{FL}$, $W_{FR}$, or the rear wheels $W_{RL}$, $W_{RR}$ act as driving wheels in the two-wheel drive mode.

Let us suppose here that during running on a rough road in the four-wheel drive mode the front left wheel $W_{FL}$ is stuck (fixed) in the road surface and the other wheels $W_{FR}$, $W_{RL}$, $W_{RR}$ are spinning. In this case, the speed difference between the left and right wheels exceeds the predetermined value, though the wheel speed sensor 10 of the specific wheel $W_{FL}$ is normal. Therefore, the aforementioned conventional system will make a misjudgment that this state is an abnormality in the sensor. The present apparatus is thus constructed to carry out the following abnormality detection.

FIG. 2 is a flowchart for executing the wheel-speed abnormality detection. First, the control unit illustrated in FIG. 1 reads in all the wheel speeds VW**(=VWFL(=$v_{FL}$), VWFR(=$v_{FR}$), VWRL(=$v_{RL}$), VWRR(=$v_{RR}$)) outputted from the wheel speed sensors, engine speed NE, a gear ratio (gear ratio×differential ratio×transfer ratio) GR from the shift position, and the radius r of tires. Then it is determined whether a vehicle-speed abnormality is detected in the ABS computer (S2).

In step (S2), when such a state that the wheel speed $v_{FL}$ of at least one specific wheel $W_{FL}$ is nearly equal to zero but the wheel speeds $v_{FR}$, $v_{RL}$, $v_{RR}$ of the other wheels $W_{FR}$, $W_{RL}$, $W_{RR}$ are not nearly equal to zero, is detected for a predetermined time (about 20 seconds) (S1), the control unit 100 judges that the wheel speed $v_{FL}$ of the specific wheel $W_{FL}$ is abnormal. When this condition is not met, the control unit judges that the specific wheel speed sensor providing $v_{FL}$ is not abnormal (S7).

Even if the wheel speed $v_{FL}$ of the specific wheel $W_{FL}$ was judged as being abnormal, the abnormality judgment is canceled when the following condition (S5) is met, i.e., when rotation of the specific wheel $W_{FL}$ is physically restrained in comparison with rotation of the other wheels $W_{FR}$, $W_{RL}$, $W_{RR}$ (in the case of the specific wheel being in the stuck state).

Namely, the control unit 100 computes an average VAVE of the wheel speeds of all the wheels $W_{FL}$, $W_{FR}$, $W_{RL}$, $W_{RR}$ (($v_{FL}+v_{FR}+v_{RL}+v_{RR}$)/4) (S3), then computes an estimated wheel speed Veng(=(NE×2πr)/GR) (based on a rotating state of the power train) estimated from rpm of the engine EGN for driving the wheels $W_{FL}$, $W_{FR}$, $W_{RL}$, $W_{RR}$ (S4), compares VAVE with Veng for about two seconds (S5), judges that the wheel speeds are abnormal when these are off a predetermined relation (S6), and judges that there is no abnormality in the wheel speed sensors when VAVE and Veng are in the predetermined relation (S7). This predetermined relation is a relation of agreement or approximate agreement (±20%).

Since the abnormality in the wheel speed sensors occurs because of disconnection, increase in sensor gaps, etc., the wheel speed outputted in this event is assumed to be always nearly equal to zero. However, the abnormality of wheel speed can also arise in the control unit 100.

When it is judged that there is no abnormality (S7), the abnormality judgment is canceled by resetting the detection time (about 20 seconds described above) necessary for the abnormality judgment. It can also be contemplated that in the case of VAVE>>Veng it is judged repeatedly that there is an abnormality in the sensors.

The present apparatus is effective in the cases wherein the wheels of the vehicle all can be the driving wheels under the traction control.

The wheel-speed abnormality detect apparatus of the present invention is able to restrain the misjudgment thereof.

What is claimed is:

1. A wheel-speed abnormality detecting apparatus comprising:

a detecting means that detects a condition of whether a rotation speed of at least one specific wheel is nearly equal to zero while rotation speeds of other wheels are not nearly equal to zero;

a judging means that makes an abnormality judgment that the rotation speed of said specific wheel is abnormal when said condition is satisfied; and a canceling means that cancels said abnormality judgment when said rotation speed of said specific wheel is physically restrained in comparison with said rotation speed of the other wheels.

2. The wheel-speed abnormality detecting apparatus according to claim 1, wherein said canceling means cancels said abnormality judgment by resetting a detection time necessary for said abnormality judgment.

3. The wheel-speed abnormality detecting apparatus according to claim 1, wherein said at least one specific wheel and said other wheels are driving wheels under traction control.

4. A wheel-speed abnormality detecting apparatus comprising:

an averaging means that calculates an average rotation speed from a plurality of rotation speeds of all wheels;

an estimating means that calculates an estimated rotation speed based on a speed of an engine;

a judging means that determines an abnormality in wheel speed when said average rotation speed and said estimated rotation speed correspond contrary to a predetermined relation.

5. The wheel-speed abnormality detecting apparatus according to claim 4, wherein said predetermined relation is a relation of agreement or approximate agreement.

6. The wheel-speed abnormality detecting apparatus according to claim 4, wherein said all the wheels are driving wheels under traction control.

* * * * *